United States Patent
Betts

[11] 3,891,967
[45] June 24, 1975

[54] ANTITHEFT ALARM SYSTEM FOR AUTOMOBILES

[76] Inventor: Clifton R. Betts, 190 Jennifer Dr., San Pablo, Calif.

[22] Filed: Oct. 15, 1973

[21] Appl. No.: 406,147

Related U.S. Application Data

[63] Continuation of Ser. No. 135,545, April 20, 1971.

[52] U.S. Cl. .................. 340/63; 307/10 BP; 340/56
[51] Int. Cl. .......................... B60g 1/04; B60r 25/10
[58] Field of Search .................. 340/63, 64, 65, 56; 307/10 LS, 10 BP, 10 AT; 337/1; 180/114

[56] References Cited
UNITED STATES PATENTS

| | | | |
|---|---|---|---|
| 3,281,785 | 10/1966 | Oursler | 340/63 |
| 3,422,398 | 1/1969 | Rubin | 340/63 |
| 3,659,266 | 4/1972 | Meyerie | 340/63 |

Primary Examiner—Glen R. Swann, III
Attorney, Agent, or Firm—Joseph B. Gardner; Theodore J. Bielen, Jr.; Richard Esty Peterson

[57] ABSTRACT

An alarm system for automotive vehicles to protect the same against unauthorized entry into any of the various compartments protected by the system including the passenger compartment, trunk compartment, and engine compartment. The system utilizes insofar as possible the existing electrical system of such vehicle including the horn, lights, and door switches thereof; and it includes a key-operated master switch accessible from the exterior of the vehicle, a relay having an energizing coil and multiple sets of contacts, and a circuit connecting the master switch with the relay and connecting the system with the closure switches and electrically operated devices of the vehicle which are to be used to attract attention to any attempt an unauthorized entry into the compartments thereof. The system when once energized continues in operation either indefinitely irrespective of whether the compartment switch initiating operation of the system remains open or closed or, in certain forms of the invention, for a definite or predetermined period resetting itself automatically for a subsequent cycle of operation if the compartment switch initiating operation of the system is deactuated as by the compartment door being closed. Also, the system may be used to energize the vehicle lights for predetermined periods to light the way for one leaving the vehicle in the absence of environmental light.

10 Claims, 4 Drawing Figures

INVENTOR.
CLIFTON R. BETTS

INVENTOR.
CLIFTON R. BETTS 3,891,967

ANTITHEFT ALARM SYSTEM FOR AUTOMOBILES

This is a continuation of application Ser. No. 135,545, filed Apr. 20, 1971.

BRIEF SUMMARY OF THE INVENTION

This invention relates to antitheft or burgular alarm systems and, more particularly, to an alarm system for automotive vehicles and the like to protect the same against unauthorized entry into one or more of the compartments thereof.

Automobile theft and unauthorized entry thereinto for purposes of removing contents therefrom are becoming increasingly prevalent, and in view of this a number of alarm systems have been proposed, some of which are commercially available, which are intended to be actuated by unauthorized entry into the vehicle to provide an alarm drawing attention thereto. Although such devices afford some degree of protection, none have been completely satisfactory for a variety of reasons among which are their cost, difficulty of installation, inadequacy or limitations on the extent of the protection afforded, unreliability, and nuisance tripping causing the system to be energized when there is no reason therefor. In view of these deficiencies, a general object of the present invention is to provide an improved alarm system for automotive vehicles and the like to protect the same against unauthorized entry, and which improved system obviates many of the disadvantages and limitations inherent in systems heretofore proposed.

Further objects, among others, of the present invention are in the provision of an improved system of the character described which is exceedingly difficult, if not practicably impossible, to disable; that is relatively easy to install, utilizing the existing electrical system of the automobile including the compartment switches thereof and various of the electrically operated devices usable when energized to attract attention to the vehicle, such as the horn, exterior lights, and interior or dome light thereof; which is relatively inexpensive with reference to the quality and extent of the protection afforded and reliability thereof; which remains in operation when once energized even though the actuated compartment or closure switch that initiated energization of the system is deactuated, such continuation of the system to provide an uninterrupted alarm being maintained either indefinitely until the system is made inoperative by manipulation of the master switch therefor or, in the alternative, for a predetermined time period whereupon the system becomes de-energized and automatically resets itself for a subsequent cycle of operation if the closure switch initiating operation of the system has been deactuated, but if such switch remains in an actuated state, the system continues to provide the alarm signaling unauthorized entry; and which system is operative to provide light for one leaving the vehicle by enabling the exterior lights to be energized for a predetermined time interval upon exiting from the vehicle, automatically extinguishing the lights upon the expiration of such interval.

Additional objects and advantages of the invention, especially as concerns particular features and characteristics thereof, will become apparent as the specification continues.

BRIEF DESCRIPTION OF THE SEVERAL VIEWS OF THE DRAWINGS

Embodiments of the invention are illustrated in the accompanying, in which.

DETAILED DESCRIPTION OF THE INVENTION

Figure 1:
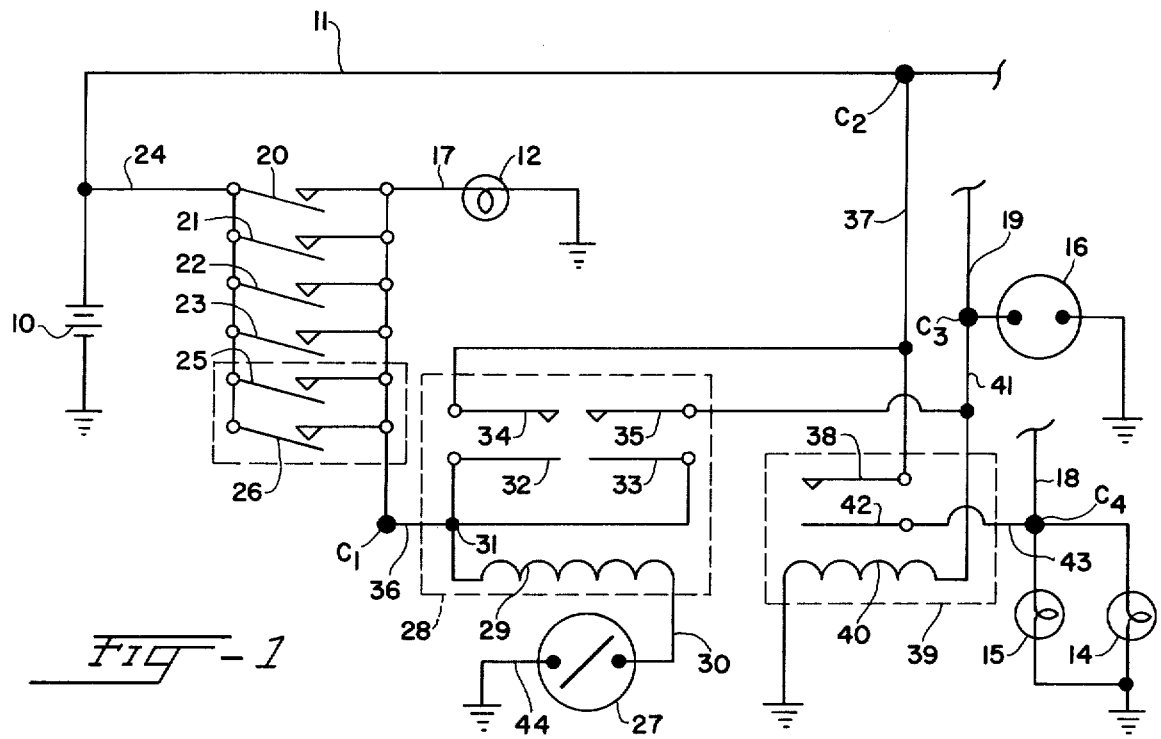
FIG. 1 is a schematic circuit diagram of one form of the system illustrating the same in association with an automotive vehicle in which the interior lights thereof are directly grounded.

As heretofore indicated, the alarm system is intended to utilize insofar as practicable the existing electrical system and components thereof comprising a part of the automotive vehicle with which the system is used. The embodiment of the invention illustrated in FIG. 1 exemplifies such an arrangement, and illustrates the alarm system in association with a vehicle in which the interior lights thereof are directly grounded. Typical examples of vehicles of this type are automobiles manufactured by the Ford Motor Company. As respects the present invention, it should be emphasized that no change of any type is required in the electrical system of such vehicle and, in the usual manner, the electrical system thereof includes a conventional storage battery 10 the negative terminal of which is grounded and the positive terminal of which is connected to the positive line or conductor 11 carrying the positive potential (usually 12 volts DC in modern vehicles) to various of the electrically operated devices of the vehicle, usually through manually operable switch controls therefor. The chassis of the vehicle is generally employed as the negative conductor of the electrical system.

The positive conductor 11 is shown to be interrupted because the various details and interconnections of the power system are not germane to the present invention and need not be considered. As respects the invention, one or more of the electrically operated devices cuustomarily provided in an automotive vehicle are used as the alarm indicia to attract attention to the vehicle when an effort is made at unauthorized entry thereinto, and the devices illustrated in FIG. 1 include the interior or dome lights 12, the exterior lights represented by the headlights 14 and taillights 15 (being shown for convenience in a parallel array), and the horn 16. One side of each of these devices is grounded, and the other sides thereof are connected indirectly (i.e., through switch controls certain of which are not shown) to the positive conductor 11 via lead wires 17, 18, and 19 respectively.

As concerns the present invention, the interior lights 12 are energized whenever at least one of the closure members or doors providing access into the interior of the passenger's compartment is opened because of the association with such doors of closure switches. The vehicle represented by the electrical system shown in part in FIG. 1 has four separate doors and four switches 20, 21, 22, and 23 respectively associated therewith. The switches 20 through 23 are connected in parallel and are normally open switches, one side of each being connected to the conductor 17 and the opposite side of each being connected to the line 11 through a conductor 24. It will be appreciated that whenever any switch 20 through 23 is closed by having the door associated therewith opened, a circuit will be completed through the interior lights 12 to energize the same in a completely conventional manner.

The alarm system illustrated in FIG. 1 is also intended to protect the vehicle against unauthorized entry into the trunk and engine compartments thereof, and for this purpose additional switches 25 and 26 are respectively arranged with the closure members therefor so as to be closed whenever the associated closure member is opened. The switches 25 and 26 are each connected in parallel with the door switches 20 through 23, and are therefore effective to energize the interior lights 12 should the closure member associated with one or the other of the additional switches 25 and 26 be opened. It should be understood that either or both of the switches 25 and 26 may be eliminated if there is no desire for the alarm system to be used to protect the trunk and/or engine compartments. For purposes of emphasizing that the switches 25 and 26 may not be provided by the associated vehicle as a standard component, they are enclosed by broken lines.

The alarm system further includes a main or master switch 27 which, in the usual instance, is a key-operated switch disposed in the vehicle so as to be accessible from the exterior thereof, thereby permitting the system to be selectively conditioned for operation after the occupants have left the vehicle. Key-operated switches of this type are commercially available components, and the switch shown is a normally open switch which is closed to permit the alarm system to be completed therethrough whenever the driver of the vehicle leaves the same. As respects its location, any convenient position may be selected, but care should be taken in such selection so that the conductor or conductors leading thereto are not accessible or are adequately protected to prevent the same from being cut which would disable the alarm system. In the arrangement shown in FIG. 1, only one conductor need be used since one side of the switch may be grounded directly to the chassis of the vehicle.

The alarm system further includes a relay generally denoted with the numeral 28, and which relay may be a standard commercial item such as a 15 ampere, 12 volt constant duty relay as, for example, Ohmite No. DOSX 66T. The relay 28 has an energizing coil 29 connected by a lead line 30 to one side of the master switch 27. The energizing coil 29 is also connected at a junction 31 to the terminals 32 and 33 which respectively define one element of normally open sets of contacts, the opposie terminals of which are respectively denoted with the numerals 34 and 35. The junction 31 is also connected by a conductor or lead wire 36 to the aforementioned conductor 17, and the point of connection thereto is denoted for identification with the designation C1. It will be understood that the connection C1 may be made at any point along the conductor 17, and in FIG. 1 such connection may be defined by the junction of the switch 26 therewith. Since the two sets of contacts provided by the relay 28 are normally open, they are not closed unless the relay is energized by current flow through the coil 29 thereof.

The terminal 34 is connected by a conductor or lead wire 37 to the positive line 11 of the electrical system of the vehicle at a junction C2, and the same lead or conductor 37 is connected to a terminal 38 forming one side of a set of contacts provided by a relay 39 which may also be a standard commercial item such as a 12 volt constant duty solenoid as, for example, Cole-Hersee no. 24059. The heavy duty relay or solenoid 39 has an energizing coil 40 one side of which is grounded and the other side is connected to a conductor or lead 41 that joins the aforementioned conductor 19 leading to the horn 16 at a junction C3. The lead 41 is also connected to the terminal 35 forming a part of one of the contact sets in the relay 28. Within the relay 39, the terminal 38 is associated with a terminal 42 that is connected by a conductor or lead 43 to the positive conductor 18 associated with the exterior lights 14 and 15 at a junction C4. As in the case of the relay 28, the set of contacts provided by the relay 39 are normally open and are only closed when the relay is energized by flow of current through the coil 40 thereof.

Considering a cycle of operation of the alarm system illustrated in FIG. 1, it may first be observed that the various electrically operated devices of the automotive vehicle used in conjunction with the alarm system function exactly as they would in the absence of the alarm system whenever such system is de-energized or disabled by opening the master switch 27. Accordingly, the interior lights 12 are energized whenever any of the doors of the vehicle are opened, the exterior lights 14 and 15 are energized and controlled in the usuall manner via the conductor 18, and the horn 16 may be actuated via the line 19. Such normal operation of these devices in no way affects the alarm system because the various contacts associated with these devices are normally open whenever the master switch 27 is open, as shown in FIG. 1.

Upon leaving the vehicle, all of the doors thereof are closed and the switch 27 turned to the operative position thereof in which it is closed. Such change in the condition of the switch 27 does not otherwise cause any change in the alarm system so that the various components thereof remain in the de-energized state illustrated in FIG. 1. When the operator of the vehicle returns thereto and wishes to open one of the closure members, he first opens the switch 27 to disable or make the alarm system inoperative so that the various compartments of the vehicle may be entered in the usual manner.

Assume now that the master switch 27 has been closed, the system nevertheless remains dormat until an effort is made to open one of the closrue members (i.e., doors, trunk lid, or hood), and if one such closure member is opened, the switch 20 through 23, 25 or 26 associated therewith will be closed whereupon a positive potential is provided through such closed switch to the conductor 17, thereby causing the interior lights 12 to be energized. At the same, however, the positive potential on the conductor 17 will be delivered to the lead 36 via the junction C1, and because of the connection of the lead 36 with the coil 29 of the relay 38, the coil is energized as a result of the circuit therethrough which is completed to ground via the closed master switch 27. Evidently then, the two sets of contacts provided by relay 28 will be closed so that the 12 volt potential present at the terminal 33 because of its connection to the junction 31 will be transmitted through the terminal 35 to the lead 41 and also to the coil 40 of the relay 39, thereby energizing the relay with the result that the terminals 38 and 42 thereof are closed. Closure of the terminals 33 and 35 of the relay causes the horn 16 to be energized via the lead 41, and concurrently therewith, closure of the terminals 38 and 42 of the relay 39 causes the exterior lights 14 and 15 to be energized via the lead 43. Therefore, as soon as one of the closure members of the vehicle is opened by an unauthorized person, the interior lights 12, exterior lights 14 and 15, and horn 16 are all energized, thereby attracting attention to the vehicle and the unauthorized attempt at entry thereto.

After once being actuated, the system and alarms being given thereby cannot be terminated by returning the closure member to its closed position because the set of contacts defined by the terminals 32 and 34 of the relay 28 are connected in a self-holding configuration. That is to say, as soon as the relay 28 is energized and the contact terminals 32 and 34 are closed, an energizing circuit through the master switch 27 and coil 29 is completed through the contact terminals 32 and 34 and through the lead 37 to the positive conductor 11 of the electrical system at the junction C2. Accordingly, the alarm system is then wholly independent of the condition of the switches 20 through 23, 25, and 26, and the alarm system can only be turned off or deactuated by opening the master switch 27. It should also be noted that energization of the interior lights 12 also becomes independent of the closure switches 20 through 23, 25, and 26 whenever the self-holding relay terminals 32 and 34 are closed because the positive potential delivered to the junction 31 via such contacts and the lead 37 will also be transmitted to the lights 12 through the lead 36, junction C1, and conductor 17. Therefore, there is no way for an unauthorized person to terminate operation of the alarm system when it is once set in operation, and all of the attention-attracting devices including the interior lights 12 will remain in continuous operation.

The alarm system is easy to install in any automotive vehicle because all of the components of the system may be housed within a single casing except for the master switch 27 and closure switches 25 and 26, if they are to be used. Thus, such casing may be mounted wherever convenient as, for example, within the engine compartment, and the various leads or conductors 36, 37, 41, and 43 leading from such casing connected to the various components of the electrical system of the vehicle, as represented by the points of connection or junctions C1, C2, C3, and C4. Since the master switch 27 is physically separate from the other components of the system, a separate wire or conductor 30 leads from the casing for connection to one of the terminals of the swithch 27. In some instances, it is advantageous to provide a single ground for the alarm system which is best effected at the casing located within the engine compartment, in which event a separate ground wire or conductor 44 may lead from the casing for connection with the opposite terminal of the switch 27.

Figure 2:
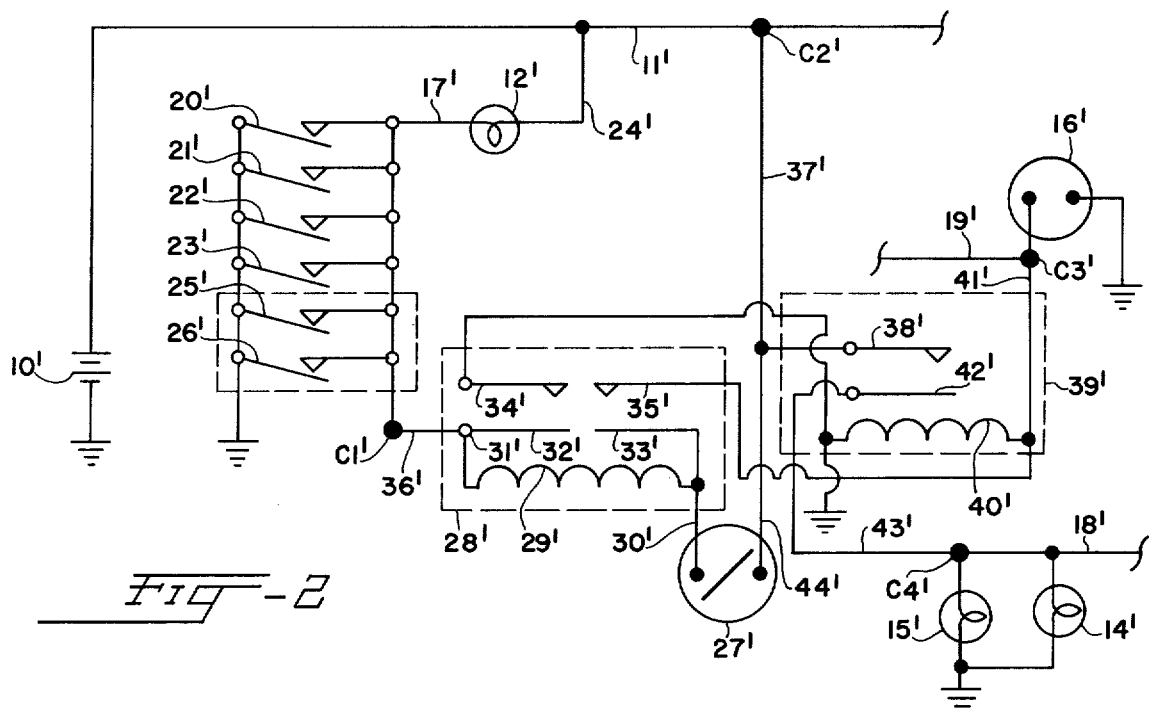
FIG. 2 is a schematic circuit diagram illustrating the form of the invention shown in FIG. 1 but in application to a vehicle in which the interior lights are connected directly to the positive side of the electrical system.

Such an arrangement is depicted more specifically in FIG. 2 which shows the alarm system of FIG. 1 arranged with an automotive vehicle in which the interior lights thereof are connected directly to the positive conductor of the electrical system. An example of automotive vehicles having electrical systems of this type are automobiles manufactured by the General Motors Company. As suggested, the alarm system and its interconnection with the electrical circuitry of the automotive vehicle as illustrated in FIG. 2 is essentially the same both in terms of construction and function as the system and interconnection thereof with the vehicle depicted in FIG. 1, and because of such essential identity, the same numerals are used to designate the respectively corresponding components except that each numeral has been primed for purposes of differentiation.

Accordingly, no particular purpose can be served by repeating the description of the various components and an operational cycle thereof, and adequate treatment of the system can reside in noting the differences in the interconnection required by the variance in the electrical system of the vehicle. In this reference, the conductor 24' connected with the positive line 11' of the electrical system terminates at the interior lights 12' rather than at one side of the closure switches. Corresponding to this change, such one side of the closure switches 20' through 23', 25', and 26' is directly grounded. The wires 36', 37', 41', and 43' are all connected as heretofore described with reference to the respectively corresponding wires in the system illustrated in FIG. 1. The master switch 27' is connected somewhat differently, however, and rather than one side thereof being grounded through direct connection with the chassis or via the aforementioned lead 44, the lead or conductor 44' corresponding thereto is connected to the positive conductor 11' of the electrical system of the vehicle via the conductor 37'. The only other changes in the system correspond to the required negative to positive shift, but the circuit functions precisely in the manner heretofore described.

Figure 3:
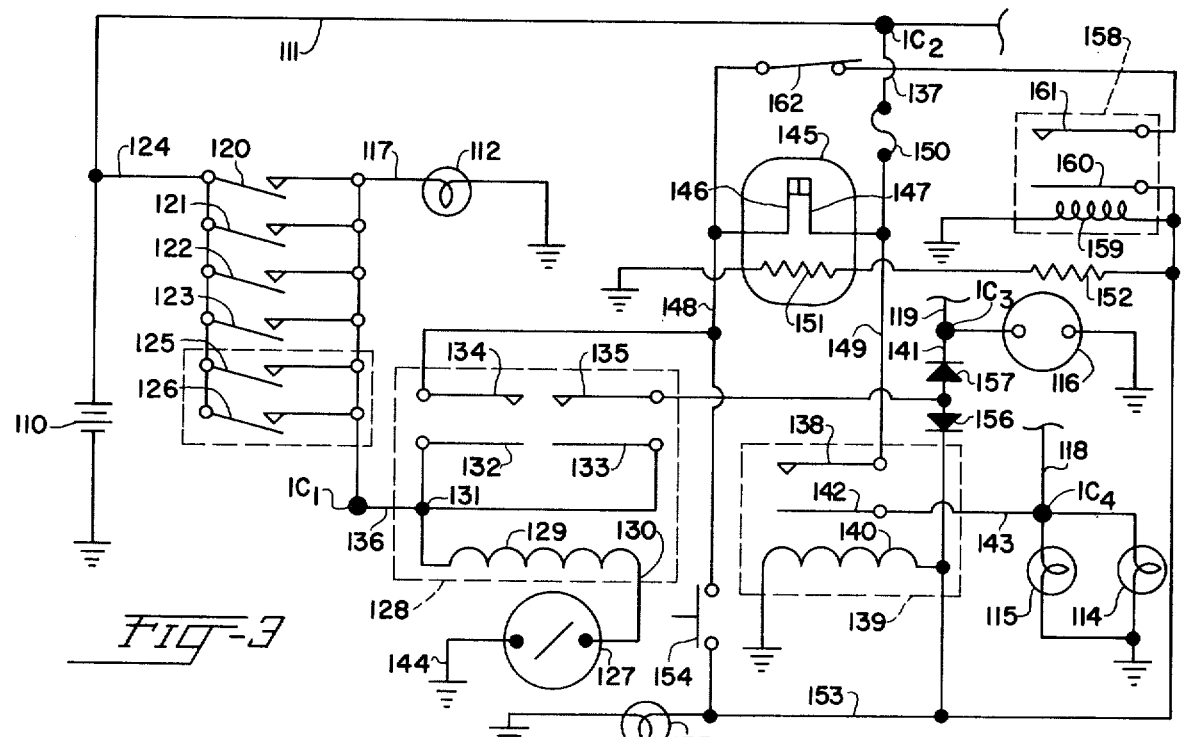
FIG. 3 is a schematic circuit diagram of a modified form of the invention shown in association with a vehicle having an electrical system of the type illustrated in FIG. 1.
Figure 4:
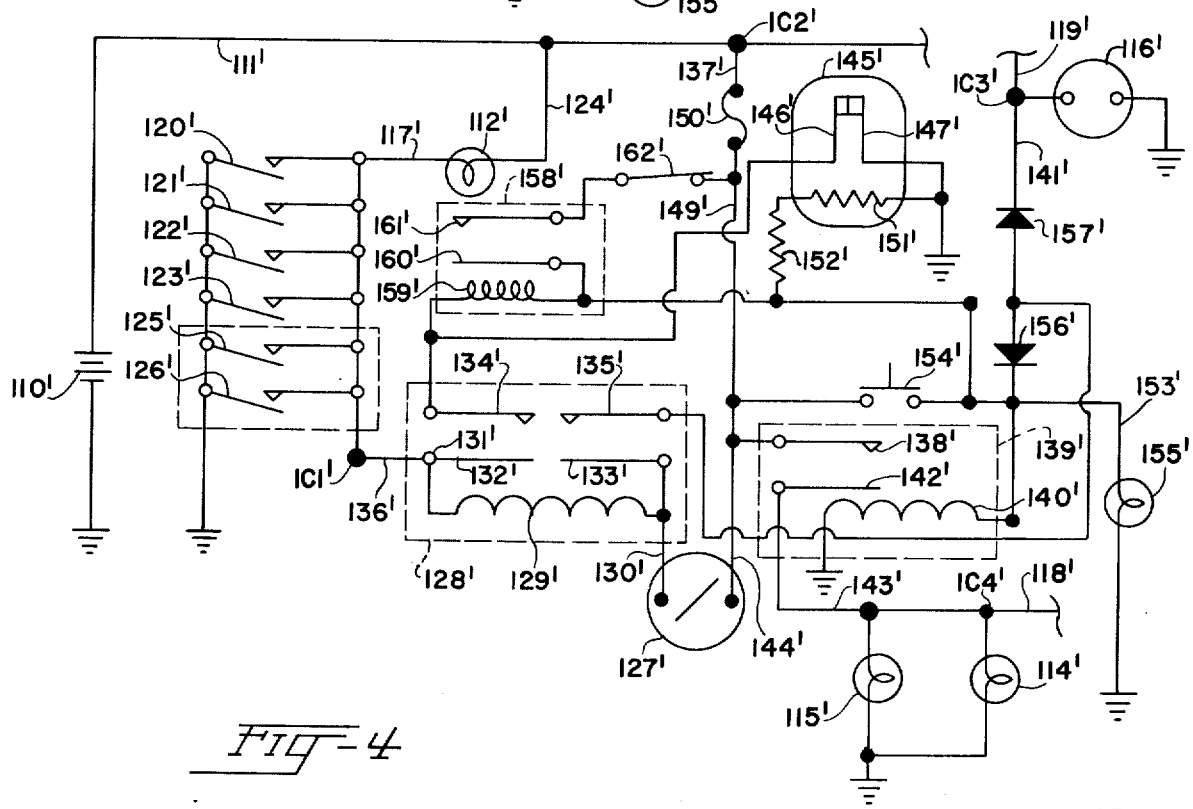
FIG. 4 is a schematic circuit diagram of the modified form of system shown in FIG. 3, but illustrating the modified system in application to a vehicle having an electrical system of the type shown in FIG. 2.

A modified embodiment of the invention is illustrated in each of FIGS. 3 and 4 in respective application to automotive vehicles having directly grounded interior lights and interior lights connected directly to the positive conductor of the electrical system of the vehicle. The modified alarm system is more refined or sophisticated than the system shown in FIGS. 1 and 2 and provides an additional function. Whereas the alarm system heretofore considered remains in an energized state when once actuated until the master switch is opened, the modified system will extinguish the alarm and reset itself automatically for a subsequent cycle of operation after remaining in operation for a predetermined period upon being actuated by an attempt to enter one of the compartments of the vehicle by unauthorized persons provided that the closure member of such compartment is closed. If such closure member has not been returned to its closed position, this information is sensed by the system which then remains in an actuated state to provide a continuous alarm signaling the unauthorized entry. Additionally, the modified system can be used to provide light about the vehicle for one leaving the same by permitting him to energize the headlights of the vehicle which then remain energized for a predetermined time interval at the expiration of which the lights are extinguished.

For the most part, these refinements are obtained by the addition of certain components to the alarm system shown in FIGS. 1 and 2 and, therefore, the alarm systems are very similar and in FIG. 3, the same numerals are used as those employed in FIG. 1 to designate the respectively corresponding components except that the order of such numerals has been raised to the 100 series. Analogously, the four primary junctions indicating interconnection of the alarm system with the electrical system of the automotive vehicle have the prefix "1" added thereto.

Referring first to FIG. 3, it may be noted that the primary change from the circuit shown in FIG. 1 is that the direct connection of the relay terminal 34 to the positive conductor 11 of the automotive system via the lead line 37 has been interrupted, and a thermal-sensitive switch 145 has been interposed between the relay terminal 134 and the lead 137 connecting with the positive conductor 111 of the vehicle. Accordingly, the self-holding characteristic of the relay 128 is influenced and controlled by the thermal-sensitive switch 145. The switch 145 is a standard component such as an Amperite relay no. 12C180.

The switch 145 has normally closed contacts 146 and 147 respectively connected to the contact terminal 134 via a conductor 148 and to the terminal 138 of the relay 139 via a conductor 149. The conductor 149 has a fuse 150 connected in series therewith, and is then connected to the positive conductor 111 of the automotive system at the junction 1C2 via the lead 137. The heater circuit of the switch 145 is indicated by a reistance 151 located within the envelop of the switch, and the heater resistance 151 is grounded at one side and is connected at its other side through a current limiting resistance 152 to the contact terminal 134 through a conductor 153 which has a manually operable, normally open momentary switch 154 connected in series therewith. The conductor 153 is also grounded through a light 155 located in proximity with the master switch 127 so as to illuminate the same when the alarm system is in operation to facilitate insertion of the key into the switch.

The conductor 153 is also connected directly to one side of the energizing coil 140 of the relay 139, and this same side of the energizing coil 140 is connected to the contact terminal 135 of the relay 128 through a blocking diode 156 enforcing a unidirectional current flow between the contact 135 and energizing coil 140. The contact 135 is also connected at the horn junction 1C3 to the horn 116 through a blocking diode 157 which also limits the direction of current flow between the horn and contact 135 to prevent infeed into the alarm system whenever the horn 116 is energized through the vehicle horn circuit represented by the lead 119. The diodes 156 and 157 may be standard 20HB5 components.

A self-holding relay 158 is also included in the circuit, and it has an energizing coil 159 one side of which is grounded and the other side of which is connected to the conductor 153 and also to one of the terminals 160 of the set of contacts provided by the relay, the other terminal 161 of which is connected to the conductor 148 and contact 146 of the thermal-sensitive switch 145 through a manually operable switch 162. The switch 162 is normally open, and the set of contacts defined by the terminals 160 and 161 of the relay 158 are also normally open.

Considering now the function of the alarm system illustrated in FIG. 3, it is set in operation exactly in the same manner as the system illustrated in FIG. 1. That is to say, upon leaving the vehicle the operator closes the master switch 127 whereupon any closure of one of the switches 120 through 123, 125 and 126 causes each of the relays 128 and 139 to be energized in the manner heretofore explained, with the result that the interior lights 112, exterior lights 114 and 115, and horn 116 are all energized. For such operation, no change is made in the momentary switch 154 and on-off switch 162. The self-holding set of contacts comprising the terminals 132 and 134 of the relay 128 have the circuit therefor completed through the conductor 148, contacts 146 and 147 of the thermal-sensitive switch 145, and through the fuse 150 and lead 137 to the positive conductor 111 of the vehicle electrical system. The heater 151 of the switch 145 is also energized because of the circuit from ground therethrough via the current limiting resistance 152 (which may be a 5.0 ohm resistor), conductor 153, diode 156, and contact terminals 135 and 133 which are at positive potential through the self-holding circuit including the contact terminals 132 and 134 and the switch 145.

The switch 145 functions to open the contacts 146 and 147 thereof after a predetermined time interval because of the temperature to which the heater 151 is elevated as a consequence of the current flow therethrough. When the contacts 146 and 147 are open, the self-holding circuit of the relay 128 through the terminals 132 and 134 thereof is interrupted whereupon the alarm system becomes de-energized provided that none of the switches 120 through 123, 125, and 126 are closed. Thus, if one of the closure members of the vehicle is opened and then quickly closed in response to the attraction caused by sounding of the horn 116 and energization of the interior and exterior lights, the alarm system will shut off or de-energize itself after being in operation for a predetermined time interval depending upon the selection or adjustment of the switch 145. If the closure switches are all open, the alarm system automatically resets itself for another cycle of operation because the switch 145 will cool since there will be no current flow through the heater 151 thereof and the contacts 146 and 147 will again resume their normally closed state. On the other hand, if one of the closure switches 120 through 123, 125, and 126 remain closed, the relay 128 is maintained in the energized state thereof because the energizing coil 129 of the relay is connected to positive potential through the lead 136, junction 1C1, actuated compartment or closure switch, and conductor 124.

If it is desired to energize the headlights of the vehicle upon leaving the same so as to provide general lighting for a predetermined time interval, this may be done either independently of or in conjunction with conditioning the alarm system for operation. More particularly, if one leaving the vehicle desires general environmental lights as, for example, to enable him to leave his garage and enter the house, etc., he closes the switch 162 (this switch usually is left in its closed state, serving as an emergency switch to de-energize the lights in the event of circuit malfunction) and then momentarily depresses the switch 154. With these two switches closed, a circuit is completed from the positive junction 1C2 through the lead 137, switch contacts 146 and 147, conductor 148, and switch 154 to the conductor 153. From the conductor 153, a portion of the current flow is to ground through the lights 155 which illuminates the master key switch 127 to facilitate manipulation thereof, and another portion of the flow is partly through the resistance 152 and switch heater 151 to ground and partly through the energizing coil 159 of the self-holding relay 158 whereupon the contacts 160 and 161 thereof close.

Following the very brief interval required to energize the self-holding relay 158, the momentary switch 154 is released to open the same. However, a positive potential still is present on the conductor 153 because of its connection to the positive junciton 1C2 through the self-holding relay terminals 160 and 161, the switch 162, and contacts 146 and 147 of the switch 145. Since a positive potential is present on the conductor 153, the coil 140 of the relay 139 is energized because of the current flow therethrough to ground and the contact terminals 138 and 142 of this relay are closed to connect the light junction 1C4 with the positive junction 1C2 through th condutors 149 and 137. Therefore, the exterior lights of the vehicle are energized.

In a manner completely analogous to its function in terminating operation of the alarm system, the thermal-sensitive switch 145 shuts off the exterior lights of the vehicle after a predetermined interval because its contacts 146 and 147 open, thereby interrupting the self-holding circuit through the relay 158 with the result that it becomes de-energized. Upon this occurrence, a positive potential is no longer applied to the conductor 153 with the result that the relay 139 is de-energized and the contact terminals 138 and 142 open to interrupt the energizing circuit to the exterior lights 114 and 115 of the vehicle. It might be noted that the blocking diode 156 prevents energizaton of the horn 116 by a positive potential on the conductor 153 so that the horn will not sound when the lights are used for environmental illumination. The blocking diode 157, as heretofore explained, prevents a positive potential from being delivered to the system and especially to the coil 140 of the relay 139 (which would cause the exterior lights to be turned on) whenever the horn is energized by manipulation of the ordinary vehicle circuit therefor.

A great variety in the time interval during which the exterior lights of the vehicle can be made operative and during which the alarm system remains energized following any unauthorized attempt to enter a compartment thereof is afforded by selection from standard thermal-sensitive switches 145. By way of example,1 ½, 2, 2½, and 3-minute intervals have been found quite satisfactory, it having been established that a 3-minute interval usually seems unnecessarily long.

The modified embodiment of the invention in application to a vehicle having an electrical system in which the interior lights have one side thereof connected directly to the positive potential of the storage battery is shown in FIG. 4. The only changes made or differences between the systems respectively illustrated in FIGS. 3 and 4 reside in the potential requirements for the shift from negative to positive relationships precisely as in the case of the changes exemplified by the potential differences illustrated in the FIG. 1 and FIG. 2 applications of the prior-embodiment of the invention. For this reason, then, there is no requirement for specific explanation of the FIG. 4 embodiment of the invention, and it will be evident that exactly the same numerals are used in FIG. 4 to identify the respectively corresponding components described with reference to FIG. 3 except that each numeral in FIG. 4 has been primed. Recapitulating, the embodiment of the invention shown in FIG. 4 is structurally similar and functionally the same as the embodiment illustrated in FIG. 3.

It will be appreciated that the alarm system illustrated and described is quite versatile, and has the advantages of utilizing many of the components already present in an automotive vehicle to which the system may be applied. However, should an alarm device other than the lights and horn of an automobile be desired, it certainly can be included in the alarm system either as an alternative to the prior-described devices or in addition thereto.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. An alarm system for automotive vehicles and the like having an electrical system, also having at least one electrically operated device usable when energized to attract attention to such vehicle to protect the same against unauthorized entry into a compartment thereof, futher having a closure member for an access opening into such compartment, and still further having a compartment switch arranged with the closure member so as to be actuated by opening thereof, comprising: a circuit having a pluality of conductors connectable with such electrical system, device, and compartment switch; a master switch connected in said circuit and movable between open and closed positions for selectively conditioning said alarm system for operation; an alarm-actuating mechanism connected in said circuit so as to maintain the same normally in an inoperative condition and such device de-energized and to effect operation of said circuit and energization of such device whenever said master switch has conditioned said alarm system for operation and such compartment switch is actuated; said alarm-actuating mechanism and said circuit being provided with operation-maintenance means effective to maintain said circuit in an operative condition and such device energized following deactivation of such compartment switch; whereby such device and compartment switch are usuable in an ordinary manner but when said master switch is closed, opening such closure member will actuate the compartment switch to energize said alarm-actuating mechanism and such device and to maintain the energized state of the latter even after deactuation of the compartment switch; condition-sampling means arranged in said circuit in operative connection with said alarm-actuating mechanism and operation-maintenance means thereof to test the condition of said circuit as determined by the condition of such compartment switch so as to return said circuit to an inoperative condition and de-energize such device after a predetermined time interval if such compartment switch is deactuated and set said alarm system for a subsequent cycle of operation or to permit said circuit to remain in the operative condition thereof with such device energized if such compartment switch remains actuated; and light switch means connectable with the exterior lights of such vehicle so as to energize the same and connected in circuit with said condition-sampling means, said light switch means being manually operable so as to energize such vehicle lights when desired and being returned to an inoperative state automatically by said condition-sampling means following expiration of a predetermined time interval.

2. The alarm system of claim 1 in which condition-sampling means includes a thermal-sensitive switch connected in series with said light switch means and operative to interrupt the circuit therethrough in response to a temperature elevation occasioned by the flow of current through said thermal-sensitive switch for a predetermined time interval.

3. The alarm system of claim 1 in which said alarm-actuating mechanism includes a relay having an energizing coil and two sets of contacts the normal conditions of which are changed by energization of said coil, said master switch being connected in series with one of said sets of contacts in a self-holding configuration with said coil and defining the aforesaid operation-maintenance means; and said alarm-actuating mechanism further including a second relay having an energizing coil connected with the other of said set of contacts provided by said first relay so as to energize the coil of said second relay whenever said other set of contacts is closed, said second relay having a normally open set of contacts connectable with the electrical system of such vehicle and with such device for energizing the latter through a separate power circuit whenever each of said relays is energized.

4. The alarm system of claim 3 in which said condition-sampling means includes a thermal-sensitive switch connected with said operation-maintenance means so as to periodically interrupt the circuit therethrough, whereby said circuit will be returned to the inoperative condition thereof if such compartment switch is then deactuated.

5. An alarm system in combination with an automotive vehicle or the like having a compartment, a closure therefor and a voltage supply providing electric power for said alarm system, comprising: a condition sampling circuit having a ground connected to said voltage supply, said condition sampling circuit containing a compartment switch arranged to complete the circuit when such closure is in the open position thereof and open circuiting the condition sampling circuit when such closure is in the closed position; an alarm activation circuit having an electrically operated device usable when energized to attract attention to such vehicle for protection of the same against unauthorized entry into such compartment; a first activation means for energizing said alarm activation circuit in response to completion of said condition sampling circuit; an alarm maintaining circuit substantially in parallel with said compartment switch when actuated; a second activation means for actuating said alarm maintaining circuit in response to completion of said condition sampling circuit; and a time delay switch in said alarm maintaining circuit providing a completed circuit for a set period of time after which said delay switch opens thereby deactuating said alarm maintaining circuit, whereby said electrically operated device is activated upon opening of the compartment closure and is maintained in the activated state for a set period of time irrespective of the condition of the compartment switch and thereafter said device is deactivated unless said compartment switch is closed.

6. The alarm system of claim 5 further comprising a direct alarm circuit having a ground directly connected to said voltage supply through said electrically operated device; a third activation means in said alarm activation circuit for actuating said direct alarm circuit in response to energization of said alarm activation circuit.

7. The alarm system of claim 6 wherein said direct alarm circuit contains a plurality of electrically operated devices in parallel.

8. The alarm system of claim 6 wherein said first and second activation means comprise an integral relay having an energizing coil and two sets of contacts corresponding to the first and second means, said contacts being normally open and closed by energization of said coil; said third activation means is a relay having an energizing coil and a set of contacts operating similarly to the other relay; said time delay switch is a thermal sensitive switch having a thermal element and a set of contacts normally closed until said thermal element reaches a set temperature occasioned by flow of current therethrough, and thereafter said contacts open and remain so until said thermal element cools to another set temperature; said alarm system further comprising a master switch in said condition sampling circuit for deactivating such alarm system whenever desired.

9. The alarm system of claim 6 wherein said device comprises the headlights of such vehicle; said alarm system further comprising a timed lighting circuit coupled to said alarm activation circuit means substantially in parallel relation with said third activation means and a manual switch operable when closed to actuate said condition-sampling means whereby said lighting circuit is actuated and the headlights are turned on, and said timed light circuit further including said time delay switch cooperatively sharing the same with said alarm maintaining circuit for breaking the timed lighting circuit after a set period of time and thereby automatically turning off said headlights.

10. The alarm system of claim 9 further comprising another electrically operated device usable when energized to attract attention to such vehicle for protection of the same against unauthorized entry into such compartment and situated in said alarm activation circuit for operation whenever said circuit is energized, whereby said device operates whenever such compartment closure is open and may continue for a set period of time even after such compartment closure is closed, and the same functions irrespective to the condition of said electrically operated device.

* * * * *